(12) United States Patent
Varkovitzky et al.

(10) Patent No.: US 6,363,775 B1
(45) Date of Patent: Apr. 2, 2002

(54) DOUBLE WALL FLUME CONTAINMENT SYSTEM WITH PRESSURIZED LEAK TESTING

(76) Inventors: Abraham Varkovitzky, 6279 Dakota Cir., Bloomfield Hills, MI (US) 48301; Ilias Iordanou, 1333 Birdie Ct., Linden, MI (US) 48451

( * ) Notice: Subject to any disclaimer, the term of this patent is extended or adjusted under 35 U.S.C. 154(b) by 0 days.

(21) Appl. No.: 09/352,230

(22) Filed: Jul. 13, 1999

Related U.S. Application Data

(60) Provisional application No. 60/092,587, filed on Jul. 13, 1998.

(51) Int. Cl.[7] .................................................. G01M 3/04
(52) U.S. Cl. ......................................... 73/49.2; 405/118
(58) Field of Search ............................ 73/40.5 R, 49.1, 73/49.2; 405/118, 119, 120, 121, 122, 123

(56) References Cited

U.S. PATENT DOCUMENTS

| | | | |
|---|---|---|---|
| 3,587,657 A | | 6/1971 | Staller ........................ 138/156 |
| 4,653,541 A | * | 3/1987 | Oehlschlaeger et al. ..... 138/104 |
| 4,751,945 A | * | 6/1988 | Williams ..................... 138/117 |
| 4,940,359 A | * | 7/1990 | Van Duyn et al. ........... 405/118 |
| 4,968,179 A | * | 11/1990 | Frahm ......................... 405/53 |
| 4,983,287 A | | 1/1991 | Arnold ........................ 210/259 |
| 5,022,685 A | * | 6/1991 | Stiskin et al. ................. 285/45 |
| 5,086,795 A | | 2/1992 | Harms .......................... 134/166 |
| 5,087,362 A | | 2/1992 | Brown ......................... 210/293 |
| 5,213,438 A | * | 5/1993 | Barenwald ..................... 404/2 |
| 5,256,000 A | * | 10/1993 | Beamer ....................... 405/119 |
| 5,343,738 A | * | 9/1994 | Skaggs ..................... 73/40.5 R |
| 5,494,374 A | * | 2/1996 | Youngs et al. ................ 405/52 |
| 5,546,790 A | * | 8/1996 | Kudo et al. .............. 73/40.5 R |
| 5,662,812 A | | 9/1997 | McEwen ..................... 210/805 |
| 5,883,815 A | * | 3/1999 | Drakulich et al. ........... 364/509 |
| 6,032,699 A | * | 3/2000 | Cochran et al. ............. 138/104 |
| 6,082,392 A | * | 7/2000 | Watkins, Jr. ................. 137/312 |

FOREIGN PATENT DOCUMENTS

JP             05098624 A        4/1993      ........... E02B/13/00

* cited by examiner

Primary Examiner—Hezron Williams
Assistant Examiner—Charles D. Garber
(74) Attorney, Agent, or Firm—Gifford, Krass, Groh, Sprinkle, Anderson & Citkowski, P.C.

(57) ABSTRACT

A double walled flume and leak detection system includes a flume with a liquid containment wall with an outer surface and an inner surface. The flume is designed to contain a liquid therein. A secondary wall has a first and second edge which are spaced apart and joined to the outer surface of the liquid containment wall so as to define a secondary containment area between the outer surface of the liquid containment wall and the secondary wall. A leak detection system is in communication with the secondary containment area for detecting the presence of liquid in the secondary containment area so that a leak may be detected.

23 Claims, 3 Drawing Sheets

DOUBLE WALL FLUME CONTAINMENT SYSTEM WITH PRESSURIZED LEAK TESTING

CROSS-REFERENCE TO RELATED APPLICATIONS

This application claims the benefit of United States Provisional Application having Serial No. 60/092,587 filed Jul. 13, 1998.

BACKGROUND OF THE INVENTION

I. Field of the Invention

The present invention relates generally to double walled containment systems and the detection of leaks within double walled containment systems.

II. Description of the Related Art

The use of double walled containment systems has become an important part of industrial design in the modern world. For hundreds of years industrial processes have generated various unwanted and often dangerous byproducts. Modem industrial processes fall into many categories and produce byproducts in many different forms. A common technique for removing byproducts from the manufacturing process is by using fluids of various types to carry away those unwanted products. Typically, as the parts are made in the manufacturing process, a stream of fluid is directed to the area where the machine tool meets the part being manufactured. This fluid has numerous functions including lubrication, cooling and cleaning. Due to the numerous functions of the fluid, it typically contains many different types of chemical compounds which may be harmful to the environment. In order to remove the used fluids from the manufacturing process, the fluids are collected at the bottom of the machine producing the part and then directed into a flume system. A flume system usually consists of a series of troughs or gutters that direct fluids from various locations to a central location. By analogy, a flume system may resemble a system of tributaries, streams and rivers that flow into one another so as to direct a liquid from a variety of locations to one or more other locations. In an industrial setting, fluids are typically directed towards a reclamation or recycling process or to a disposal system.

Flume systems may be connected to machining systems, turning systems or even various electronics assembly systems. When designing a facility which utilizes machines which require connection to a flume system, the facility is preferably designed with the requirements of the flume system incorporated into the building design. Typically, the flume systems are designed into the floor and foundation of the facility. The floors should be constructed with specific types of concrete which meet the requirements of the machine tools to be installed on top of the foundation. Along with the various load requirements of the foundation, the foundation must also accommodate the flume system.

The current state of the art in design of flume systems requires that the flume be built into the foundation with a double walled containment system surrounding the flume system. This double walled system helps ensure that should the primary flume system fail, the dangerous products which may be running through the flume are not exposed to the concrete and underlying foundation of the facility. The current state of the art flume systems employ a J-shaped piece of extruded metal. The lower portion of the J-shaped piece forms a semi-circular bottom wall of the flume and the upwardly extending portion of the J-shaped piece defines one side wall. A flat piece of extruded metal is welded onto the end of the semi-circular bottom wall away from the first side wall and defines a second side wall. The completed flume has a U-shaped cross section with a weld at the base of one of the side walls. Following the welding of those two pieces, there is formed around the lower part of the flume another semi-circular piece of extruded metal which extends entirely around the semi-circular bottom wall and the area where the weld joins the bottom wall to the second side wall. The prior art systems were designed in this manner for a number of reasons. The primary reason was to move the weld from the bottom of the flume up to the side of the flume to reduce the impact of any leaks or breaks in the weld on the environment around the flume. By wrapping the double walled containment system entirely around the J portion of the flume, the designers could be fairly certain that any breaches in the welds would have minimal impact on the environment.

The prior art designs, however, have numerous problems. The initial problem with the prior art is the use of the two distinct pieces of extruded material which are non-interchangeable. The storage and handling of the J-shaped portion is difficult due to the overlap of the semi-circular portion, and forming a J-shaped portion is expensive.

The production of the double walled containment portion of the prior art flume systems is also problematic. A great deal of metal is required to produce the shape which will cover not only the weld section but also the entire lower portion of the flume system. Additional problems include the difficult placement of welds, precise shape of the double containment portion and difficult installation. Probably the most problematic area of the prior art systems is the detection of breaches in the welds to those flume systems. The prior art systems required complicated x-ray and inspection techniques in order to locate the breaches in the welds. Even systems which contained view ports into the lower portion of the double containment area do not facilitate the accurate location of breaches in the flume.

SUMMARY OF THE INVENTION

The present invention provides a double walled flume and leak detection system. The flume has a liquid containment wall with an outer surface and an inner surface. The flume is operable to contain a liquid therein. A secondary wall is joined to the liquid containment wall so as to define a secondary containment area. Specifically, the secondary wall has a first edge and second edge which are spaced apart and joined to the outer surface of the liquid containment wall. The secondary containment area is defined between the outer surface of the liquid containment wall and the secondary wall. A leak detection system communicates with the secondary containment area for detecting the presence of liquid in the secondary containment area.

BRIEF DESCRIPTION OF THE DRAWINGS

A better understanding of the present invention will be had upon reference to the following detailed description when read in conjunction with the accompanying drawings in which.

DESCRIPTION OF THE PREFERRED EMBODIMENTS

A system according to the present invention will be described in conjunction with the drawings. It will be understood, however, that the system of the present invention will have applications in other areas of the manufacturing process and that the description of the present invention with respect to the described embodiments is by way of example only.

Figure 1:
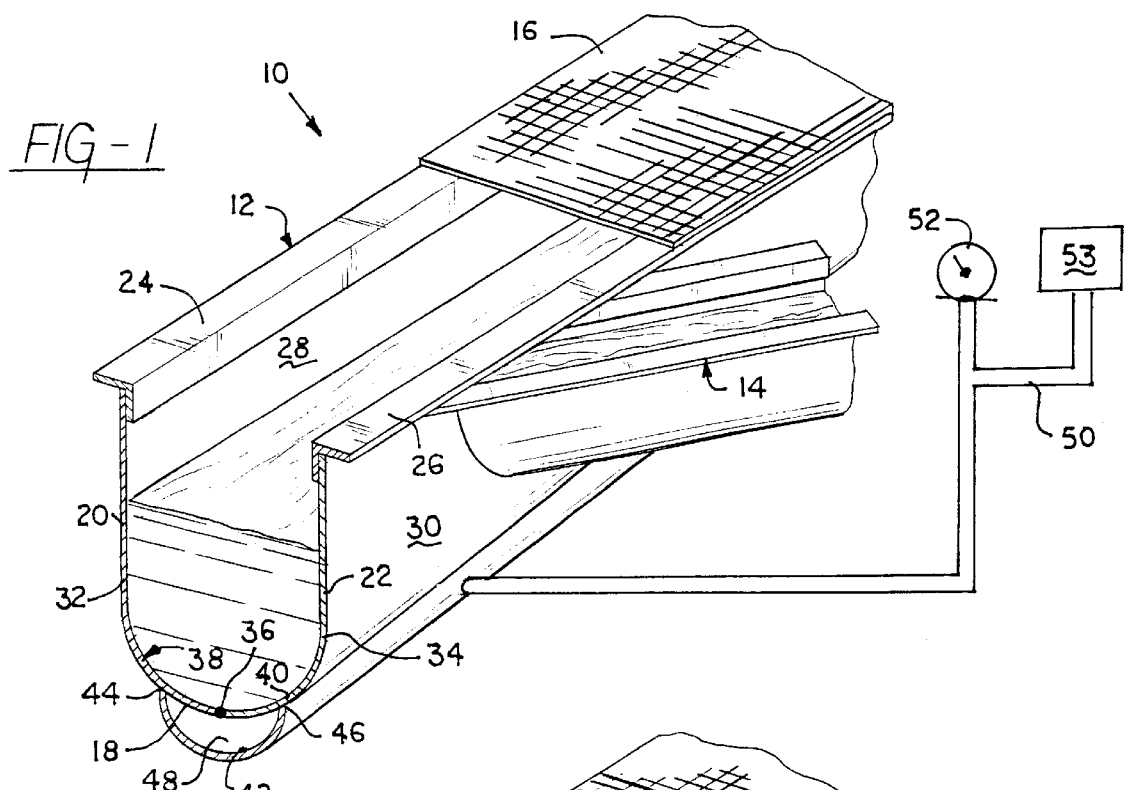
FIG. 1 is a perspective view of a portion of a flume system according to the present invention with part of the main flume being cut away to show one embodiment of a secondary containment area according to the present invention.

Referring to FIG. 1, a portion of a fluid collection system according to the present invention is generally shown at 10. The fluid collection system is designed to conduct fluids from a plurality of locations to a central location. For example, machining fluids may be conducted from a plurality of machine tools to a central recycling or disposal location. The entire fluid collection system resembles a system of tributaries, streams and rivers with smaller amounts of fluid being joined together until all the fluid reaches the central location. In the portion of the fluid collection system 10 shown in FIG. 1, a main flume 12 is shown with a tributary flume 14 joining the main flume 12. Each flume 12 and 14 is essentially a trough in which fluid flows with the trough getting deeper or slanting downwardly in the direction of flow. Typically, these flumes 12 and 14 are embedded in a concrete floor of a factory with the top of each flume 12 and 14 adjacent the surface of the concrete floor. The top of the flume 12 and 14 maybe left open to the atmosphere so that fluids may flow into the trough from a variety of locations. In certain exposed sections, a cover 16 may be used to cover the trough to prevent injury or prevent small items from falling into the flume 12.

It should be understood that the portion of the fluid collection system 10 shown in FIG. 1 would be part of a larger system. In FIG. 1, the main flume 12 is shown cut off so as to allow an easy description of the structural features of the double walled flume according to the present invention.

Referring to the cut off cross section of the main flume 12, the structural features of the flume 12 will now be described. As shown, the flume 12 has a generally U-shaped cross section with a semi-circular bottom wall 18 and a pair of parallel and spaced apart upwardly extending side walls 20 and 22. A right angle flange 24 is joined to the top of the first side wall 20 so that a perpendicular flange extends outwardly from the top of the side wall 20. Such a right angle flange 24 is often referred to as an angle iron. The flange has two portions positioned at right angles to one another with one portion joined to the top of the side wall 20 and the other extending perpendicularly outwardly therefrom. Alternatively, the side wall 20 may be formed with an outwardly extending flange at the top thereof. Likewise, a right angle flange 26 is disposed at the top of the second side wall 22 with a flange extending perpendicularly outwardly from the top thereof.

Together the semi-circular bottom wall 18 and the side walls 20 and 22 form a liquid containment wall designed to contain a liquid therein. The liquid containment wall has an inner surface 28 and an outer surface 30. As will be clear to those of skill in the art, the U-shaped flume may be formed in a variety of manners. In addition, the flume does not necessarily have to have a U-shaped cross section.

Typically, a U-shaped flume 12 would be constructed in order to meet the specifications of a particular fluid collection system 10. Therefore, particular combinations of length and depth and downward angles may be required. In FIG. 1, the U-shaped portion of the flume 12 are formed from a first and a second J-shaped side piece 32 and 34 that are joined to one another at their bases as shown by weld 36. As shown, the first J-shaped side piece 32 has a straight portion which defines the first side wall 20 and an arcuate portion 38 that forms half of the semi-circular bottom wall 18. That is, the arcuate portion 38 describes approximately a 90 degree arc. Likewise, the second J-shaped side piece 34 has a straight portion that defines the second side wall 22 and an arcuate portion 40 that defines the other half of the semi-circular bottom wall 18. The arcuate portions 38 and 40 are joined to one another by weld 36 so as to form the completed U-shaped flume. The flanges 24 and 26 are then attached to the upper portions of the side walls 20 and 22. By combining various shapes and sizes of J-shaped side pieces 32 and 34 with flanges 24 and 26, the desired shape of flume 12 may be achieved.

In use, traditional flumes may develop leaks allowing contaminated fluid contained therein to leak into the surrounding concrete floor or into the soil below. Repair of the leaking flume system is costly because it requires cutting or breaking up the concrete floor, removing the flume system and replacing it with a new flume system. It is desirable to be able to detect a leak so that it may be sealed or so that just a portion of the flume system may be replaced. In this regard, the flume 12 includes a secondary wall 42 with a first edge 44 and a second edge 46. The edges 44 and 46 are spaced apart and joined to the outer surface 30 of the liquid containment wall so as to define a secondary containment area 48 between the outer surface 30 of the liquid containment wall and the secondary wall 42. As shown, in this first embodiment, the secondary wall is a semi-circular piece of metal, such as a piece of pipe cut in half. In one preferred embodiment, the semicircular secondary wall has a diameter less than the diameter of the semicircular bottom wall 18. The edges 44 and 46 are joined to the outer surface 30 of the liquid containment wall on opposite sides of the weld 36 by welding the edges 44 and 46 to the outer surface 30. Therefore, the secondary containment area 48 acts as a secondary barrier for any leaks which occur in the liquid containment wall between the first and second edges 44 and 46 of the secondary wall 42. In the configuration shown, this area includes the weld 36 which is likely to be the most leak prone area. The secondary wall 42 acts both as a secondary barrier and also, preferably, strengthens the bottom of the flume 12 to prevent stress fractures when the concrete floor is poured about the flume 12.

In a further aspect of the present invention, a leak detection system is provided in communication with the secondary containment area for detecting the presence of liquid in the secondary containment area. A first embodiment of a leak detection system according to the present invention is illustrated in FIG. 1. In this embodiment, a pressurization connection 50 is provided to allow the secondary containment area 48 to be pressurized such as by using compressed air. As shown, the pressurization connection 50 consists of pipes which are in fluid connection with the secondary containment area 48 and extend upwardly to the surface of the surrounding concrete floor. A gauge 52 is shown attached to the top of the pressurization connection 50. This type of leak detection system may be utilized in a variety of ways. First, pressurized air may be applied to the pressurization connection 50 so as to pressurize the secondary containment area 48. The gauge 52 may then be monitored for drops in pressure. If a leak occurs in a portion of the liquid containment wall defining the top of the secondary containment area 48, the pressurized air will be allowed to leak out through the leak causing a drop in pressure in the secondary containment area 48. The leak can then be located by repressurizing the secondary containment area 48 through the pressurization connection 50 and looking for bubbles indicating the location of the leak.

As will be clear to those of skill in the art, a pressurized system such as this, even without substantial leaks, is likely to slowly lose pressure over time. Therefore, according to another aspect of the present invention, the secondary containment area 48 may be connected to a more complex pressurization and monitoring system. For example, the pressurization connection 50 may be interconnected with a source of pressurized air, such as often provided in a factory environment. The pressure in the secondary containment area 48 may be periodically and/or automatically repressurized. This repressurization system is generally shown as box 53 and may include a monitoring device that monitors the rate at which each secondary containment area 48 requires repressurization. Any substantial change in the rate at which repressurization is required may set off an alarm indicating that the system requires a thorough examination. In one embodiment, the system is repressurized to between 30 and 40 psi and electronic monitoring triggers an alert if the frequency of repressurization changes substantially. As another alternative, the secondary containment area 48 may be periodically manually repressurized and the rate of pressure drop monitored either manually or automatically.

As mentioned previously, a system of flumes is typically provided as part of a fluid collection system. Each of these flumes, including main flumes 12 and tributary flumes 14 preferably include secondary containment areas 48. The secondary containment areas may be interconnected so that they may be pressurized as a group. Alternatively, the secondary containment areas may be individually sealed off so that they may be separately monitored.

Figure 2:
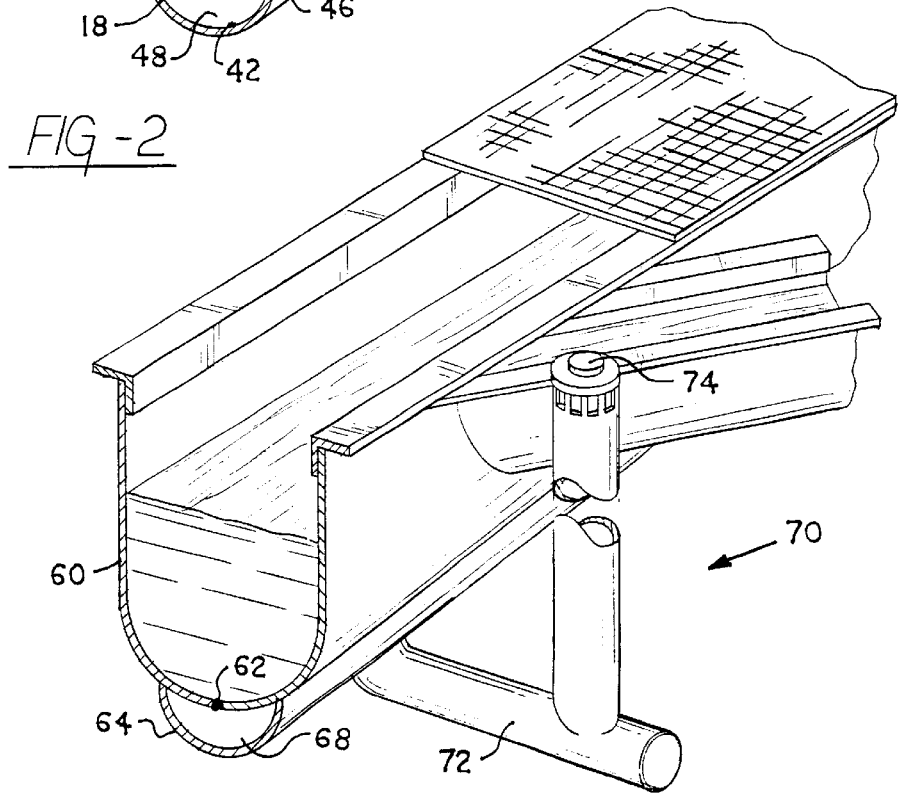
FIG. 2 is a cross sectional perspective view of a second embodiment of a double walled flume and leak detection system according to the present invention.
Figure 4:
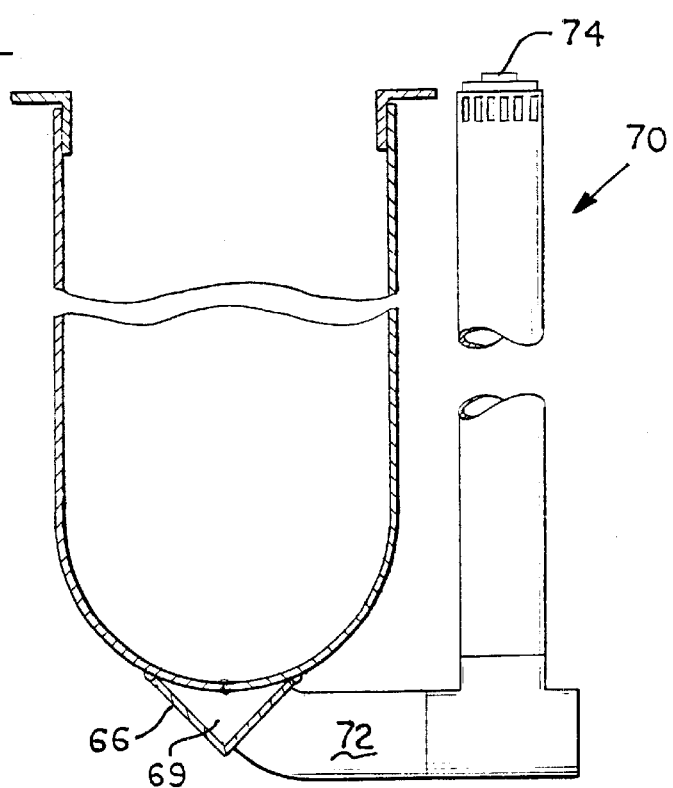
FIG. 4 is a cross sectional end view of a fourth embodiment of a double walled flume and leak detection system according to the present invention.

Referring now to FIG. 2, a second embodiment of the present invention will be described. As in the previous embodiment, a flume 60 with a U-shaped cross section is provided with a weld 62 at the bottom. Once again, a semi-circular secondary containment wall 64 is provided. As will be clear to those of skill in the art, any of a variety of shapes of secondary containment walls may be used. Referring to FIG. 4, a V-shaped secondary containment wall 66 is shown. As another alternative, the secondary containment wall may be a three sided rectangular-shaped extruded channel. As will be clear to those of skill in the art, any of these shapes of secondary containment walls, or other shapes, may be used with any of the embodiments of the present invention without departing from its scope.

Referring now to both FIGS. 2 and 4, a second embodiment of a leak detection system according to the present invention is generally shown at 70. In this embodiment, a view pipe 72 is joined to the bottom of the secondary containment wall 64 or 66 so that any liquid leaking into the secondary containment area 68 or 69 will flow down into the view pipe 72. The view pipe 72 slopes downwardly and then extends upwardly to a view port 74 in the surface of the concrete floor. A user may then look through the view port 74 to see if any fluid is present in the view pipe 72. The presence of fluid in the view pipe 72 would indicate that fluid has leaked into the secondary containment area 68 or 69. Preferably, the view pipe 72 is interconnected with a low point in the secondary wall 64 or 66 so that leaks in any portion of the flume can be detected through the view port 74. Alternatively view pipes 72 and view ports 74 may be located at various positions along the run of a flume so that leaks at a variety of locations may be detected. This optical detection approach to leak detection may be combined with the air pressurization leak detection system of the previous embodiment. For example, if a leak is detected through the view port 74, a fitting may be attached to the view port to allow air pressure to be introduced to the secondary containment area 68 or 69 so as to locate a leak. Also, an air pressurization leak detection system, such as in the previous embodiment, may be made to include view ports for optical inspection.

Figure 3:
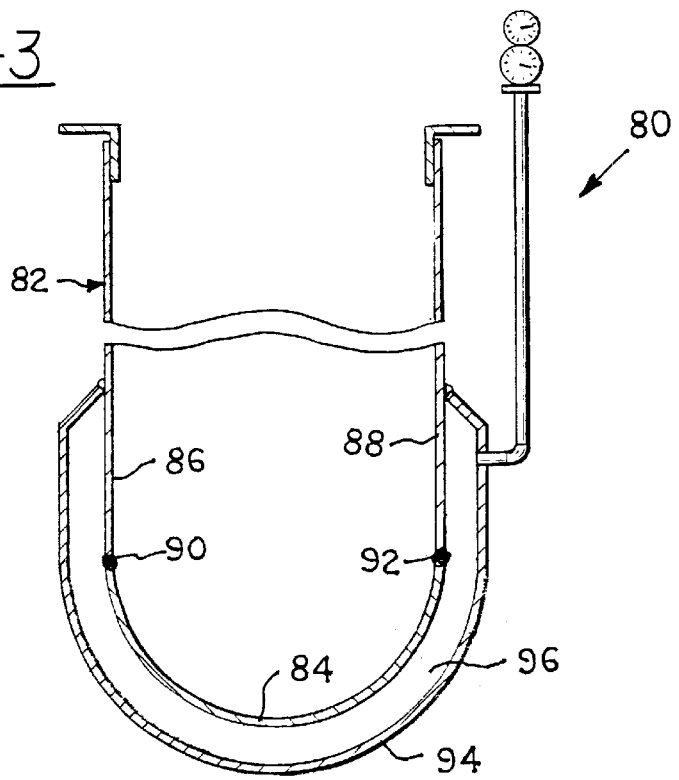
FIG. 3 is a cross sectional end view of a third embodiment of a double walled flume and leak detection system according to the present invention.

Referring now to FIG. 3, another embodiment of a double walled flume and leak detection system according to the present invention is generally shown at 80. This embodiment differs from the previous embodiments in several respects. First, the U-shaped cross section of the liquid containment wall 82 is formed from three pieces rather than from two. As shown, the liquid containment wall 82 is formed from a semi-circular portion 84 which defines the semi-circular bottom wall of the U-shaped cross section. To this are joined a pair of flat side walls 86 and 88 using welds 90 and 92. This approach to forming the U-shaped cross section liquid containment wall 82 allows more complex flumes to be formed from less complex pieces. This approach to forming the flume may be used with the earlier embodiments of the leak detection system and vice versa. Because the welds 90 and 92 are located at the base of the side walls 86 and 88, rather than at the bottom of the semi-circular bottom wall 84, the secondary wall 94 is preferably larger so as to overlap the portion of the liquid containment wall 82 including the welds 90 and 92. Preferably, the secondary wall 94 joins the side walls 86 and 88 at a location above the normal liquid level in the flume so as to contain all areas where leaks may occur. As shown, the secondary wall 94 is generally U-shaped and is joined to the outer surface of the liquid containment wall 82 at a location above the welds 90 and 92. Together the liquid containment wall 82 and the secondary wall 94 define a secondary containment area 96. As in the previous embodiment, this secondary containment area 96 may be pressurized to form a leak detection system. As will be clear to those of skill in the art, this shape of secondary wall 94 and secondary containment area 96 may also be used with the optical leak detection system of FIGS. 2 and 4.

As an alternative to the construction shown in FIG. 3, the U-shaped liquid containment wall 82 may be formed of two pieces wherein one of the pieces incorporates the entire semi-circular bottom wall 84 and one of the two side walls 86 or 88. This would form a J-shaped section with a 180 degree arcuate bottom portion. To this would be joined the second wall to form the U-shaped liquid containment wall 82. This would result in only a single weld in the position shown for either weld 90 or 92.

Figure 5:
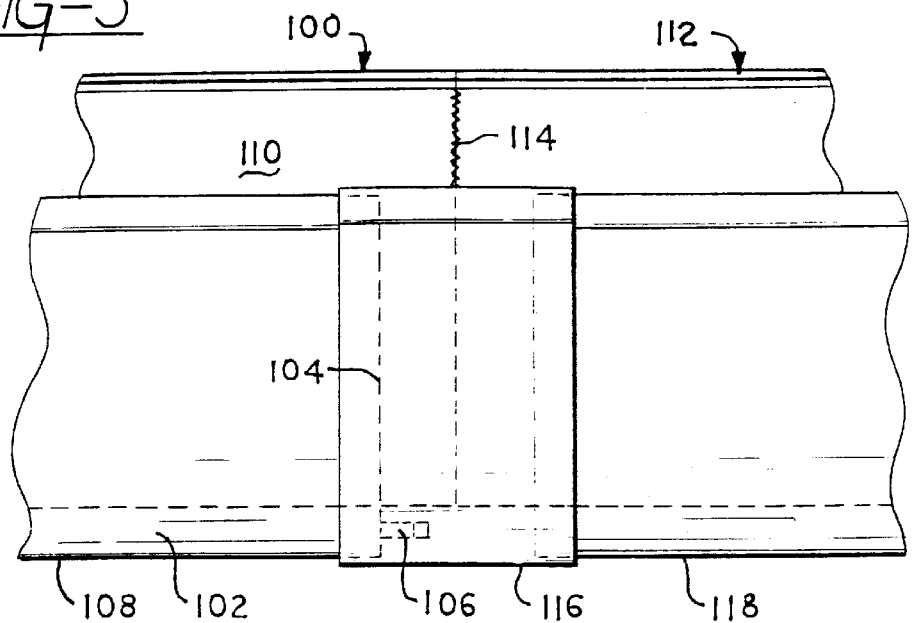
FIG. 5 is a side view of two sections of double walled flume joined so as to interconnect both the flume and the secondary containment area.
Figure 6:
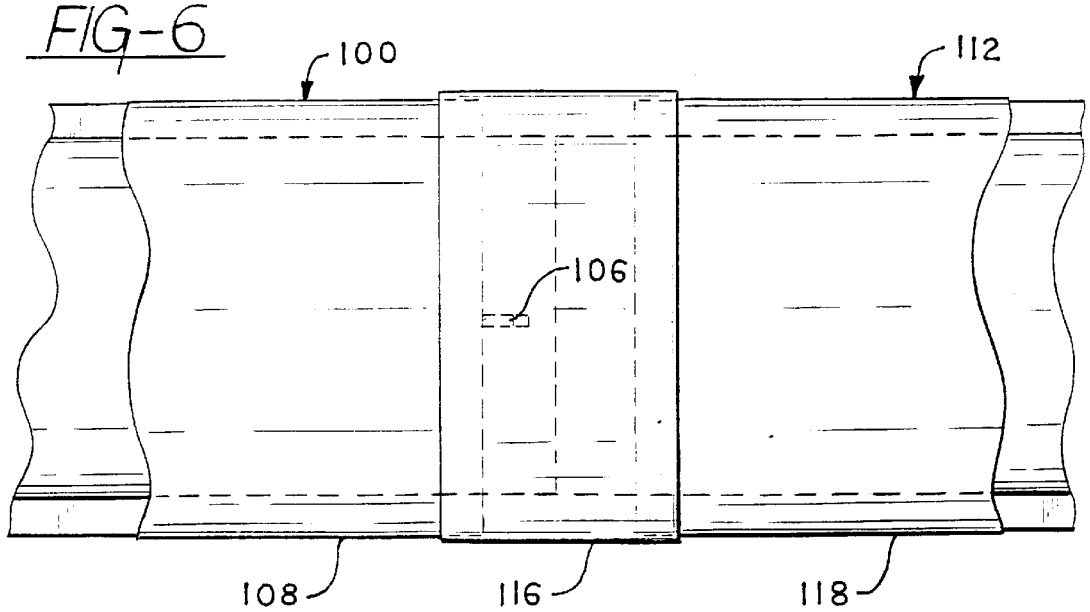
FIG. 6 is a bottom view showing the two sections of double walled flume of FIG. 5.

Referring now to FIGS. 5 and 6, further aspects of the present invention will be discussed. It is preferable that once a section of flume is constructed from its various constituent parts, that it be checked for leaks prior to installation in the floor. Accordingly, a piece of double walled flume 100 is shown in FIGS. 5 and 6 ready for installation. As shown, the secondary containment area 102 is sealed off by an end wall 104 so as to seal the containment area 102 for this portion of flume 100. This end wall 104 is recessed from the end of the section of flume 100 and a piece of pipe 106 extends from the end wall 104 and is in communication with the secondary containment area 102. Though not shown, the other end of the piece of flume 100 is constructed in a similar fashion, though instead of a pipe 106 extending therefrom, a port is made in the end wall 104. The pipe 106 may be capped to seal one end of the secondary containment area 102. Pressure may then be applied to the port in the other end to check for any leaks in any of the welds forming the flume or joining the secondary wall 108 to the liquid containment wall 110.

After pressure testing to verify the integrity of the double walled flume 100, the pipe 106 may be uncapped and assembled to an adjacent piece of flume as shown in FIGS. 5 and 6. A first piece of flume 100 is shown being joined to a second piece of flume 112. The two pieces of flume 100 and 112 are butted against each other and joined by a weld 114. As discussed earlier, the end wall 104 of the secondary containment area 102 is recessed. This allows access to the butted joint for proper welding. Once the two pieces of flume 100 and 112 are butt welded to one another, a blank 116 is installed over the butt weld so as to overlap the secondary walls 108 and 118 of the two pieces of flume 100 and 112 so as to interconnect them. In this way, the flumes are joined and the secondary containment areas are also in fluid communication with one another. If each section 100 and 112 is individually tested prior to installation and then joined, quality sealing is more assured.

Having described our invention, however, many modifications, including but not limited to materials and attachment means, pressure systems and leak detection systems, thereto will become apparent to those of skill in the art to which it pertains without deviation from the spirit of the invention as defined by the scope of the appended claims.

We claim:

1. A double wall flume and leak detection system comprising:
    a flume having a liquid containment wall with an outer surface and an inner surface, said flume operable to contain a liquid therein;
    a secondary wall having a first and second edge, said edges being spaced apart and joined and sealed to said outer surface of said liquid containment wall so as to define a secondary containment area between said outer surface of said liquid containment wall and said secondary wall, said secondary wall having a pair of spaced apart ends;
    end walls joined and sealed to the ends of the secondary wall and the outer surface such that the secondary containment area is sealed to the outer surface; and
    a leak detection system in communication with said secondary containment area for detecting the presence of the liquid in said secondary containment area, said leak detection system comprising a pressurization system for pressurizing said secondary containment area.

2. The double wall flume and leak detection system according to claim 1, wherein said liquid containment wall has a U-shaped cross section with a half-circular bottom wall having a first diameter.

3. The double wall flume and leak detection system according to claim 2, wherein said secondary wall has a semicircular cross section.

4. The double wall flume and leak detection system according to claim 3, wherein said semicircular cross section of said secondary wall has a second diameter less than s aid first diameter.

5. The double wall flume and leak detection system according to claim 1, wherein said liquid containment wall has a bottom wall and two upwardly extending side walls, said first and said second edges being joined to said side walls.

6. The double wall flume and leak detection system according to claim 1, wherein said leak detection system further comprises a monitoring system for monitoring pressure in said secondary containment area.

7. The double wall flume and leak detection system according to claim 6, wherein said monitoring system comprises a pressure gauge.

8. The double wall flume and leak detection system according to claim 6, wherein said monitoring system comprises an electronic system operable to trigger an alert if the pressure changes at a rate greater than a predetermined threshold.

9. The double wall flume and leak detection system according to claim 1, wherein said leak detection system further comprises a repressurization system for repressurizing said secondary containment area when the pressure drops.

10. The double wall flume and leak detection system according to claim 9, wherein said leak detection system further comprises a monitoring system operable to trigger an alert if the frequency at which repressurization is required changes more than a predetermined amount.

11. The fluid collection system according to claim 1 wherein the flume includes at least one weld in a portion of said liquid containment wall between said first and second edges of said secondary wall so that said secondary containment area includes said weld.

12. A double wall flume and leak detection system comprising:
    a flume having a liquid containment wall with an outer surface and an inner surface, said wall comprising two symmetrical halves joined together by a longitudinal weld, said flume operable to contain a liquid therein;
    a secondary wall having a first and second edge, said edges being spaced apart and joined to said outer surface of said liquid containment wall so as to define a secondary containment area between said outer surface of said liquid containment wall and said secondary wall, said edges being joined to said outer surface on opposite sides of said weld such that said secondary containment area includes said weld; and
    a leak detection system in communication with said secondary containment area for detecting the presence of the liquid in said secondary containment area.

13. The double wall flume and leak detection system according to claim 12, wherein said liquid containment wall has a U-shaped cross-section with a half-circular bottom wall having a first diameter.

14. The double wall flume and leak detection system according to claim 13, wherein said secondary wall has a semi-circular cross-section.

15. The double wall flume and leak detection system according to claim 14, wherein said liquid secondary wall has a second diameter less than said first diameter.

16. The double wall flume and leak detection system according to claim 12, wherein said liquid containment wall has a bottom wall and two upward extending side walls, said first and second edges of said secondary wall being joined to said side walls.

17. The double wall flume and leak detection system according to claim 12, wherein said leak detection system comprises a view pipe in fluid communication with said secondary containment area, such that fluid in said secondary containment area flows into said view pipe, said leak detection system further comprising a view port in optical communication with said view pipe for optically detecting fluid in said view pipe.

18. The double wall flume and leak detection system according to claim 12, wherein said leak detection system comprises a pressurization system for pressurizing said secondary containment area.

19. The double wall flume and leak detection system according to claim 18, wherein said leak detection system further comprises a monitoring system for monitoring pressure in said secondary containment area.

20. The double wall flume and leak detection system according to claim 19, wherein said monitoring system comprises a pressure gauge.

21. The double wall flume and leak detection system according to claim 19, wherein said monitoring system comprises an electronic system operable to trigger an alert if the pressure changes at a rate greater than a predetermined threshold.

22. The double wall flume and leak detection system according to claim 18, wherein said leak detection system further comprises a repressurization system for repressurizing said secondary containment area when the pressure drops.

23. The double wall flume and leak detection system according to claim 22, wherein said leak detection system further comprises a monitoring system operable to trigger an alert if the frequency at which repressurization is required changes more than a predetermined amount.

* * * * *

UNITED STATES PATENT AND TRADEMARK OFFICE
CERTIFICATE OF CORRECTION

PATENT NO. : 6,363,775 B1
DATED : April 2, 2002
INVENTOR(S) : Abraham Varkovitzky It is certified that error appears in the above-identified patent and that said Letters Patent is hereby corrected as shown below:

Column 1,
Line 21, replace "modem" with -- modern --

Column 7,
Line 66, replace "s aid" with -- said --

Column 8,
Line 58, replace "liquid" with -- semi-circular cross-section of said --.

Signed and Sealed this

Twenty-ninth Day of October, 2002

*Attest:*

JAMES E. ROGAN
*Attesting Officer*     *Director of the United States Patent and Trademark Office*